US010220800B2

(12) United States Patent
    Brichet

(10) Patent No.: US 10,220,800 B2
(45) Date of Patent: Mar. 5, 2019

(54) INSULATION ELEMENT

(71) Applicant: SIKA TECHNOLOGY AG, Baar (CH)

(72) Inventor: Nicolas Brichet, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/634,574

(22) Filed: Jun. 27, 2017

(65) Prior Publication Data

US 2017/0369004 A1   Dec. 28, 2017

(30) Foreign Application Priority Data

Jun. 27, 2016   (EP) .................................... 16176491

(51) Int. Cl.
| | | |
|---|---|---|
| *B60R 13/08* | (2006.01) | |
| *B62D 25/00* | (2006.01) | |
| *B62D 29/00* | (2006.01) | |
| B29C 44/02 | (2006.01) | |

(52) U.S. Cl.
CPC .............. *B60R 13/08* (2013.01); *B62D 25/00* (2013.01); *B62D 29/002* (2013.01); *B29C 44/02* (2013.01); *Y10T 428/24479* (2015.01)

(58) Field of Classification Search
CPC ............ B60R 13/08; Y10T 428/24479; B62D 29/002; B62D 25/00; B29C 44/02
USPC ........................................................ 428/156
See application file for complete search history.

(56) References Cited

U.S. PATENT DOCUMENTS

| | | | |
|---|---|---|---|
| 2006/0057333 A1* | 3/2006 | Brahim ............... | B29C 44/1214 428/138 |
| 2007/0138683 A1* | 6/2007 | Kanie ................... | B29C 44/18 264/51 |
| 2009/0167055 A1* | 7/2009 | Niezur ................... | B32B 3/12 296/187.02 |
| 2012/0039665 A1* | 2/2012 | Richardson ......... | B29C 37/0085 403/265 |
| 2015/0315782 A1* | 11/2015 | Belpaire ................ | B60R 13/08 181/294 |

(Continued)

FOREIGN PATENT DOCUMENTS

| | | |
|---|---|---|
| EP | 1362683 A2 | 11/2003 |
| JP | 2006-001472 A | 1/2006 |

(Continued)

OTHER PUBLICATIONS

Jul. 31, 2018 Office Action issued in European Application No. 16176491.5.

*Primary Examiner* — David Sample
*Assistant Examiner* — Donald M Flores, Jr.
(74) *Attorney, Agent, or Firm* — Oliff PLC.

(57) ABSTRACT

An insulation element for insulating a structural element in a vehicle includes a support element having a first surface and a second surface and an expandable material, which is arranged at least on partial areas of the first surface of the support element. The support element has at least one penetration and the expandable material projects through the penetration and forms a protrusion on one side of the second surface of the support element. The protrusion is dimensioned and the expandable material designed in such a way that the protrusion has a larger cross section after expansion than a cross section of the penetration.

14 Claims, 3 Drawing Sheets

(56) References Cited

U.S. PATENT DOCUMENTS

2016/0136852 A1* 5/2016 Richardson ......... B29C 37/0085
264/447

FOREIGN PATENT DOCUMENTS

WO 2011/146793 A1 11/2011
WO 2014/095620 A 6/2014

* cited by examiner

INSULATION ELEMENT

The invention relates to an insulation element having a support element and an expandable material, in particular for insulating a structural element with a cavity in a vehicle. It furthermore relates to a system having a structural element and an insulation element arranged therein.

In many cases, construction elements such as bodies and/or chassis of means of transport and locomotion, especially those of watercraft or land vehicles or of aircraft, have structures with cavities to allow lightweight construction. However, these cavities cause many different problems. Depending on the type of cavity, it must be sealed to prevent the ingress of moisture and dirt, which can lead to corrosion of the construction elements. It is often also desirable to significantly reinforce the cavities and thus the construction element but to retain the low weight. Often it is also necessary to stabilize the cavities and thus the construction elements in order to reduce noise, which would otherwise be transmitted along the cavity or through the latter. Many of these cavities have an irregular shape or small dimensions, making it more difficult to seal, reinforce and deaden them correctly.

Particularly in motor vehicle construction but also in the construction of aircraft and boats, sealing elements ("baffles") are therefore used to seal and/or acoustically shut off cavities, or reinforcing elements ("reinforcers") are used to reinforce cavities.

A body of a motor car is illustrated schematically in FIG. 1. Here, the body 10 has various structures with cavities, such as pillars 14 and beams or struts 12. Such structural elements 12, 14 with cavities are generally sealed or reinforced with sealing and/or reinforcing elements 16.

FIGS. 2a and 2b show schematically a known concept for the sealing and/or reinforcing closure of openings or cavities in a motor vehicle.

Here, FIG. 2a shows an insulation element 16 before expansion of an expandable material 13, FIG. 2b shows the same insulation element 16 but after expansion of the expandable material 13, i.e. with the expanded material 13'. The insulation element 16 is situated in a cavity in a body structure of the kind illustrated in FIG. 1. A section of such a structural element 12, 14 of the body is illustrated schematically in FIGS. 2a and 2b. The insulation element 16 comprises a support element 11, which has an edge region 21. In this case, the expandable material 13 is arranged substantially on said edge region 21 of the support element 11.

Before the expansion of the expandable material 13, there is a gap between the insulation element 16 and the structural element 12, 14. This gap makes it possible to coat the structural element 12, 14 in order to achieve corrosion protection of the structural element 12, 14. After this coating, the expandable material 13 is usually expanded by the action of heat, as a result of which the expanded material 13' closes the gap between the insulation element 16 and the structural element 12, 14. By means of the expansion of the expandable material 13, fixing of the insulation element 16' in the structural element 12, 14 is also simultaneously achieved. On the one hand, an insulation element 16' secured in the structural element 12, 14 in this way reinforces the structural element 12, 14 and, on the other hand, it closes the cavity in the structural element 12, 14.

The disadvantage with such insulation elements 16 is that the expandable material 13 and the support element 11 are not connected to one another in an optimum manner. This is disadvantageous both for storage or transportation of the insulation element 16 and for carrying out the expansion in the structural element 12, 14. During the expansion of the expandable material 13, some of the expandable material 13 can come away from the support element 11 and be displaced, resulting in less advantageous arrangement of the expanded material 13' in the structural element 12, 14.

It is therefore the underlying object of the invention to provide an improved insulation element of the type stated above, in particular an insulation element with improved fixing of the expandable material on the support element.

This object is achieved by an insulation element for insulating a structural element in a vehicle, the insulation element comprising a support element having a first surface and a second surface and an expandable material, which is arranged at least on partial areas of the first surface of the support element. The support element has at least one penetration and the expandable material projects through the penetration and forms a protrusion on one side of the second surface of the support element. The protrusion is dimensioned and the expandable material designed in such a way that the protrusion has a larger cross section after expansion than a cross section of the penetration.

This solution has the advantage that significantly better fastening of the expandable material on the support element can thereby be achieved. With the solution proposed here, the expandable material can be arranged in a simple manner on the support element. No special method steps or tools are necessary here. The specific arrangement of the expandable material on the first surface of the support element and in the penetration and in the protrusion projecting through the penetration results in a greatly improved joint between the expandable material and the support element by virtue of the expansion.

A core concept of the present invention consists in designing the protrusion in such a way that expansion gives it a larger cross section than the penetration in the support element as quickly as possible. This can be achieved, for example, if the protrusion is made thin in comparison with the remaining expandable material. In this way, heat can act in an ideal way on the protrusion and expand it more quickly than other parts of the expandable material. As rapid as possible expansion of the protrusion will secure the expandable material reliably on the support element because, owing to the expansion of the protrusion, the expandable material can no longer be removed from the penetration. The unexpanded insulation element likewise has an adequate joint between the expanded material and the support element because the protrusions ensure that the expandable material cannot be moved sideways away from the support element.

In the context of this invention, the term "insulation element" includes elements for shutting off and/or reinforcing and/or insulating a structural element. Here, these different properties of an insulation element of this kind can occur individually or in combination with one another.

In the context of this invention, the term "cross section" with reference to the penetration and the protrusion means a cross section substantially in one plane of the support element. Thus, the cross sections of the penetration and of the protrusion are substantially orthogonal with respect to an axis of the penetration.

In one illustrative embodiment, the cross section of the penetration and the cross section of the protrusion have an identical shape. Here, for example, the cross section of the protrusion can be slightly smaller than the cross section of the penetration. Such uniformity of the cross sections has the advantage of simplifying the production of the insulation element. For example, this allows the expandable material to be extruded onto the support element in a known manner.

In one illustrative embodiment, the cross section of the penetration and the cross section of the protrusion have a substantially equal area.

This has the advantage that, as a result, the expandable material is already well connected to the support element before the expandable material and the protrusion are expanded.

In one illustrative embodiment, the protrusion is of cylindrical, conical or stepped design.

Such an embodiment of the protrusion has the advantage that, as a result, the expandable material can be applied to the support element by conventional methods.

In one illustrative embodiment, the protrusion has a constant cross section. In one illustrative development, the cross section of the protrusion is circular, elliptical or oval.

In one illustrative embodiment, the cross section of the protrusion has a maximum diameter of 1 to 10 mm, preferably of 1.5 to 8 mm, particularly preferably of 2 to 5 mm.

In one illustrative embodiment, the protrusion has a length of 0.5 to 30 mm, preferably of 1 to 15 mm, particularly preferably of 1.5 to 8 mm, measured from the second surface to a free end of the protrusion.

Such dimensioning of the protrusion in respect of the cross section thereof and in respect of the length thereof has the advantage that, as a result, heat responsible for the expansion of the expandable material can act as effectively as possible on the protrusion. Here, shapes expand more quickly, the larger is the surface thereof in relation to the volume thereof. The protrusion proposed here takes account of this aspect. As a result, it is possible to achieve as rapid as possible expansion of the protrusion, ensuring that the expandable material expands as early as possible in the expansion process and, as a result, the expandable material is bonded effectively to the support element.

In one illustrative embodiment, the support element has a plurality of penetrations, and the expandable material forms a plurality of protrusions.

The provision of a plurality of protrusions in a plurality of penetrations has the advantage that better bonding of the expandable material to the support element can thereby be achieved.

In one illustrative development, the penetrations are arranged in an edge region of the support element.

In one illustrative development, the penetrations are distributed substantially over the entire length of the support element along the edge region.

In one illustrative development, a spacing between adjacent penetrations is between 5 and 50 mm, preferably between 7 and 35 mm, particularly preferably between 10 and 20 mm.

Arranging the penetrations in the edge region and at regular intervals over substantially the entire length of the support element has the advantage that all the expandable material arranged on the support can thereby be secured reliably on the support element.

In one illustrative embodiment, the expandable material forms a single continuous element. In an alternative embodiment, a plurality of unconnected expandable materials forms a plurality of unconnected elements.

In one illustrative embodiment, the expandable material has an expansion rate of 300 to 3000%. In one illustrative development, the expandable material has an expansion rate of 1000 to 2700% or between 1500 and 2500%.

Such an expansion rate of the expandable material ensures that the protrusion has a larger cross section than the cross section of the penetration after expansion.

A system having a structural element and an insulation element according to the above description arranged therein is furthermore proposed.

Details and advantages of the invention are described below by means of illustrative embodiments and with reference to schematic drawings, in which.

Figure 1:
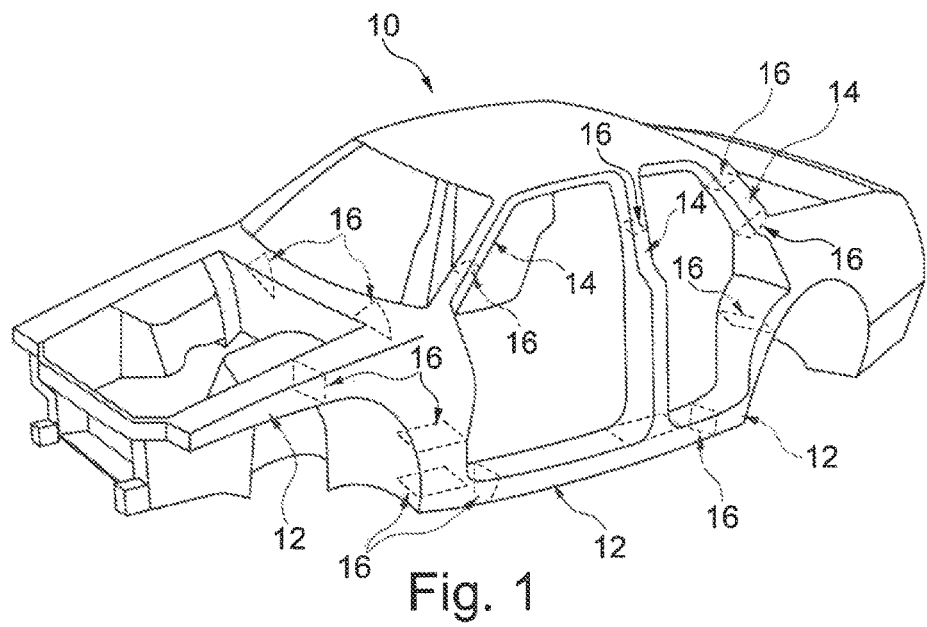
FIG. 1 shows an illustrative depiction of a body according to the prior art.
Figure 2A:
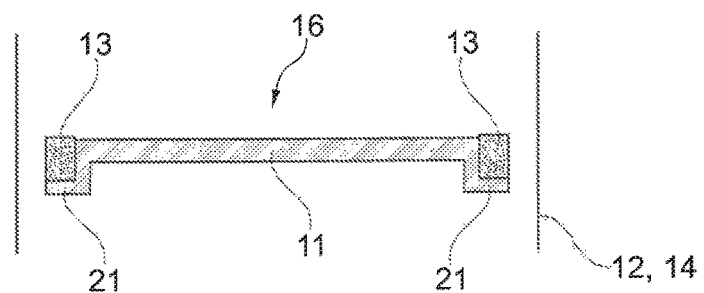
FIGS. 2a and 2b show schematic depictions intended to explain an illustrative insulation element according to the prior art.
Figure 2B:
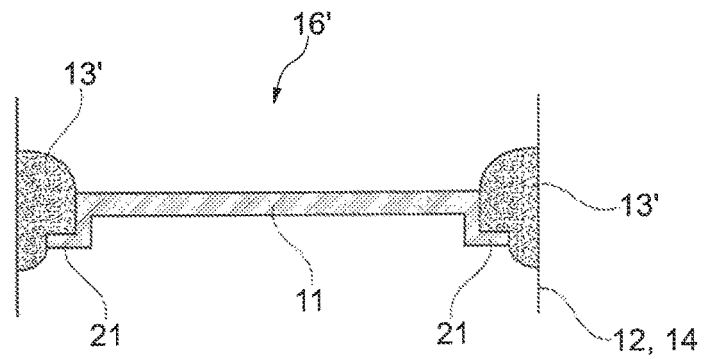

An illustrative insulation element 16 is shown in FIG. 3a. The insulation element 16 has a support element 11 and an expandable material 13 arranged thereon. In this case, the expandable material 13 is arranged at least on a partial area of a first surface of the support element 11. In this illustrative embodiment the expandable material 13 is arranged on an edge region 21 of the support element 11. The support element 11 has a plurality of penetrations. The expandable material 13 forms protrusions 33, which project through the penetrations in the support element 11 and, as a result, project beyond one side of the second surface of the support element 11. In this illustrative embodiment, the penetrations and the protrusions are arranged substantially over the entire length of the support element 11.

Figure 3:
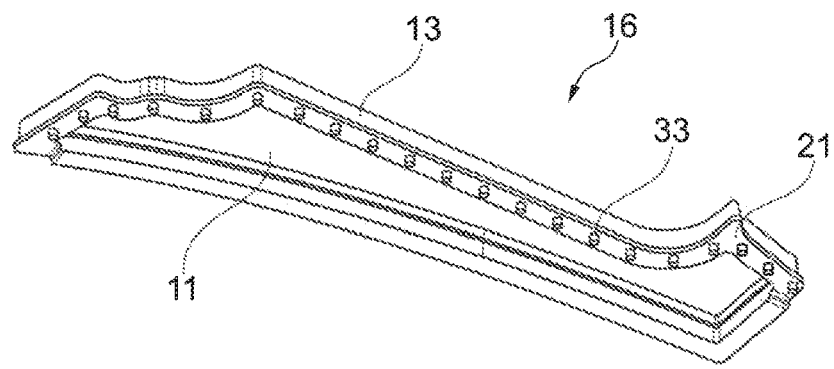
FIG. 3 shows a schematic illustration of an illustrative insulation element.
Figure 4:
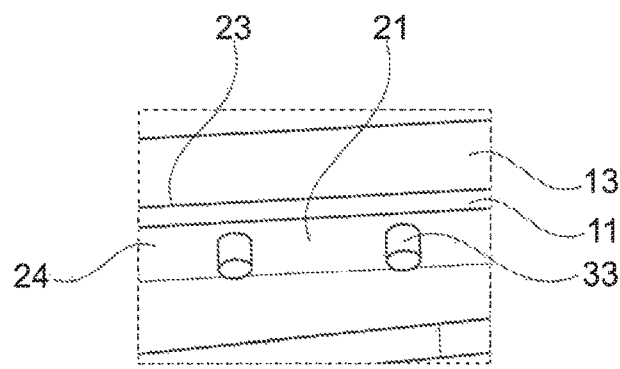
FIG. 4 shows a schematic illustration of a detail of an illustrative insulation element.

A detail of the illustrative insulation element 16 shown in FIG. 3 is shown in FIG. 4. Once again, the expandable material 13 is arranged on the first surface 23 of the support element 11. Here too, the expandable material 13 is arranged on an edge region 21 of the support element 11. In this case, the expandable material 13 forms protrusions 33, which project through penetrations in the support element 11 and, as a result, project beyond one side of the second surface 24 of the support element 11.

Figure 5:
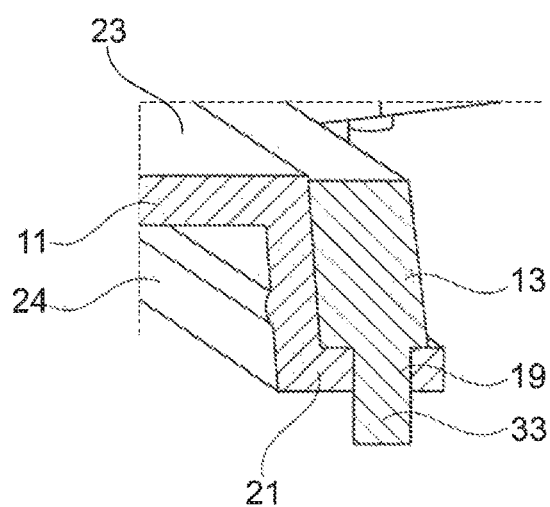
FIG. 5 shows a schematic illustration of a cross section through a detail of an illustrative insulation element.
Figure 6A:
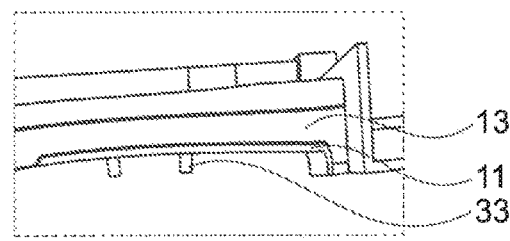
FIGS. 6a to 6f show schematic illustrations of an illustrative expansion process of an illustrative insulation element.
Figure 6B:
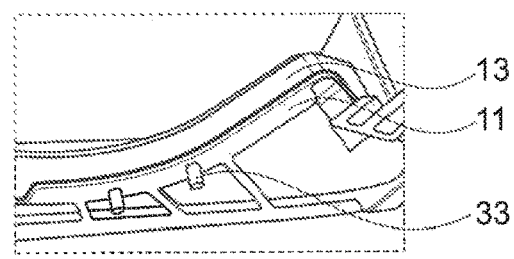
Figure 6C:
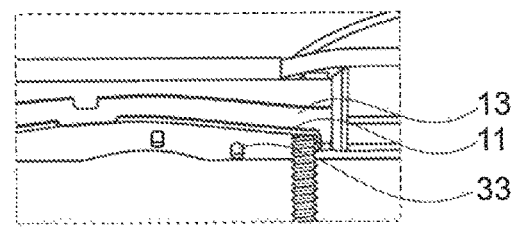
Figure 6D:
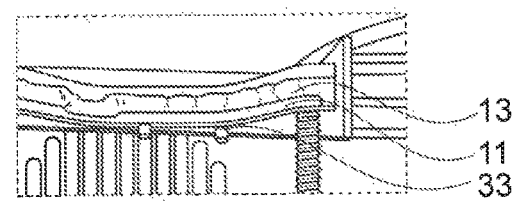
Figure 6E:
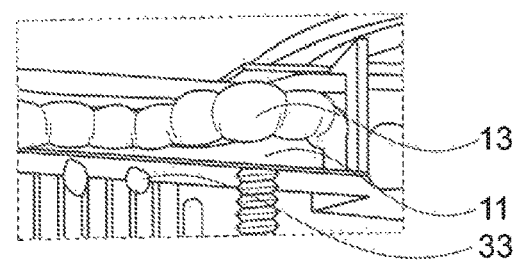
Figure 6F:
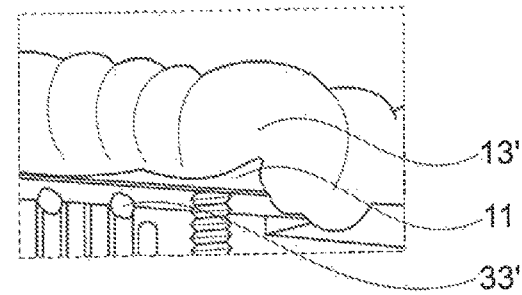

A cross section of the detail of the illustrative insulation element 16 shown in FIG. 4 is shown in FIG. 5. This cross section in FIG. 5 illustrates the projection of the expandable material 13 through the penetration 19 in the support element 11, wherein the expandable material 13 forms a protrusion 33 which projects beyond one side of the second surface 24 of the support element 11. Here, the expandable material 13 is arranged at least on partial areas of the first surface 23 of the support element 11. In this illustrative embodiment too, the expandable material is arranged substantially on an edge region 21 of the support element 11.

In FIGS. 6a to 6f, an illustrative expansion process of an illustrative insulation element 16 under the action of heat is shown. Here, it can be seen that the expandable Material 13 remains in the envisaged position thereof on the support element 11 during the entire expansion process. In this case, the expansion of the protrusions 33 prevents unwanted separation of the expandable material 13 from the first surface of the support element 11 during the expansion process. The fully expanded insulation element shown in FIG. 6f has an expanded material 13' and expanded protrusions 33', which are all arranged in the envisaged position thereof on the support element 11.

Expandable (Foamable) Materials

In principle, any desired material that can be made to foam in a controlled manner can be used as an expandable material. This material can have reinforcing properties or not. Typically, the foamable material is foamed thermally, by means of moisture or by electromagnetic radiation.

An expandable material of this kind typically has a chemical or physical foaming agent. Chemical foaming agents are organic or inorganic compounds which decompose under the effect of temperature, moisture or electromagnetic radiation, wherein at least one of the decomposition products is a gas. As physical foaming agents, use can be made, for example, of compounds which change to the gaseous state of aggregation when the temperature is increased. Thus, both chemical and physical foaming agents are capable of producing foamed structures in polymers.

The expandable material is preferably foamed thermally using chemical foaming agents. Examples of suitable chemical foaming agents are azodicarbonamides, sulphohydrazides, hydrogen carbonates or carbonates.

Suitable foaming agents can also be obtained commercially under the trade name Expancel® from Akzo Nobel, Netherlands, or under the trade name Celogen® from Chemtura Corp., USA, for example.

The temperature required for foaming can be introduced by means of external or internal heat sources, such as an exothermic chemical reaction. The foamable material can preferably be foamed at a temperature of ≤200° C., in particular of 140° C. to 190° C., preferably of 160° C. to 180° C.

Examples of suitable expandable materials are one-component epoxy resin systems that do not flow at room temperature, which, in particular, have a high impact resistance and contain thixotropic agents, such as aerosils or nanoclays. For example, such epoxy resin systems contain 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable hardeners. Suitable impact modifiers are reactive liquid rubbers based on nitrile rubber or derivatives of polyether polyol polyurethanes, core-shell polymers and similar systems known to a person skilled in the art.

Expandable materials that are likewise suitable are one-component polyurethane compositions containing a foaming agent, built up from crystalline polyesters containing OH groups mixed with other polyols, preferably polyether polyols, and polyisocyanates with blocked isocyanate groups. The melting point of the crystalline polyester should be ≥50° C. The isocyanate groups of the polyisocyanates can be blocked with nucleophiles such as caprolactam, phenols or benzoxalones, for example. Also suitable are blocked polyisocyanates such as those which are used in the powder coating industry and are commercially available under the trade names Vestagon® BF 1350 and Vestagon® BE 1540 from Degussa GmbH, Germany, for example. "Encapsulated" or surface-deactivated polyisocyanates are likewise suitable as isocyanates, these being known to a person skilled in the art and described in. EP 0 204 970, for example.

Also suitable as expandable materials are two-component epoxy/polyurethane compositions containing foaming agents, as described in WO 2005/080524 A1, for example.

Also suitable as expandable materials are ethylene-vinyl acetate compositions containing foaming agents.

Expandable materials that are likewise suitable are sold under the trade name SikaBaffle® 240, SikaBaffle® 250 or SikaBaffle® 255 by Sika Corp., USA, and are described in U.S. Pat. No. 5,266,133 and U.S. Pat. No. 5,373,027.

Other suitable expandable materials are sold under the trade name SikaBaffle®-450, SikaBaffle®-420, SikaBaffle®-250NT, SikaBaffle®-255 and SikaBaffle®-250PB2 by Sika. Expandable materials of this kind have an expansion rate of approximately 300-3000% and are particularly preferred for the present invention.

Particularly suitable for the purposes of the present invention is SikaBaffle®-450, with an expansion rate of more than 1200%, because a high expansion rate ensures that the second partial area of the first surface is reliably covered during the expansion of the expandable material.

In a specific preferred illustrative embodiment, an arrangement of the expandable material on the support element shown in FIG. 3a having a ratio of a mass of the expandable material to a size of the first surface of approximately 2.5 g/cm$^2$ is implemented. In this case, the expandable material has an expansion rate of approximately 2000% when acted upon by a temperature of 180° C. for 30 minutes. It is thereby possible to achieve complete coverage of the first surface with expanded material, giving the described advantages of the invention in respect of acoustic deadening.

Examples of preferred expandable materials having reinforcing properties are those sold under the trade name SikaReinforcer® 941 by Sika Corp., USA. These are described in U.S. Pat. No. 6,387,470.

Support Material

The support material can be composed of any desired materials. Preferred materials are plastics, especially polyurethanes, polyamides, polyesters and polyolefins, preferably high-temperature-resistant polymers, such as poly(phenylene ether), polysulphones or polyether sulphones, in particular these also being foamed; metals, especially aluminium and steel; or cultivated organic materials, especially wood or other (compacted) fibre materials or vitreous or ceramic materials; especially also foamed materials of this kind; or any combinations of these materials. Particularly preferred is nylon, especially nylon 6, nylon 6,6, nylon 11, nylon 12 or a blend thereof. Combinations with fibres, e.g. glass fibres or carbon fibres, are also possible.

Furthermore, the support element can have any desired construction and any desired structure. For example, it can be solid, hollow or foamed or have a grid-type structure. The surface of the support element can typically be smooth, rough or structured.

In the case of sealing and reinforcing elements according to the invention, in which the expandable material is situated on a support element, the production method differs according to whether the support element is or is not composed of a material that can be processed by injection moulding. If this is the case, a two-component injection moulding method is generally used. In this case, a first component, in this case the support element, is moulded first of all. After this first component has solidified, the cavity in the die is enlarged or adapted, or the moulding produced is placed in a new die and a second component, in this case the expandable material, is moulded onto the first component by means of a second moulding unit.

If the support element is composed of a material which cannot be produced by the injection moulding method, that is to say, for example, of a metal, the support element is placed in a corresponding die and the expandable material is moulded onto the support element. Of course, there is also the possibility of securing the expandable material on the support element by special securing means or methods.

The invention claimed is:

1. An insulation element for insulating a structural element in a vehicle, the insulation element comprising
    a support element having a first surface and a second surface, and
    an expandable material, which is arranged at least on partial areas of the first surface of the support element, wherein
    the support element has at least one penetration and the expandable material projects through the penetration and forms a protrusion on one side of the second surface of the support element,
    the protrusion has a constant cross section, and
    the protrusion is dimensioned and the expandable material designed in such a way that the protrusion has a larger cross section after expansion than a cross section of the penetration.

2. The insulation element according to claim 1, wherein the cross section of the penetration and the cross section of the protrusion have an identical shape.

3. The insulation element according to claim 1, wherein the cross section of the penetration and the cross section of the protrusion have a substantially equal area.

4. The insulation element according to claim 1, wherein the protrusion is of a cylindrical design.

5. The insulation element according to claim 1, wherein the cross section of the protrusion is circular, elliptical or oval.

6. The insulation element according to claim 1, wherein the cross section of the protrusion has a maximum diameter of 1 to 10 mm.

7. The insulation element according to claim 1, wherein the protrusion has a length of 0.5 to 30 mm, measured from the second surface to a free end of the protrusion.

8. The insulation element according to claim 1, wherein the support element has a plurality of penetrations, and the expandable material forms a plurality of protrusions.

9. The insulation element according to claim 8, wherein the penetrations are arranged in an edge region of the support element.

10. The insulation element according to claim 9, wherein the penetrations are distributed substantially over the entire length along the edge region of the support element.

11. The insulation element according to claim 8, wherein a spacing between adjacent penetrations is between 5 and 50 mm.

12. The insulation element according to claim 1, wherein the expandable material forms a single continuous element.

13. The insulation element according to claim 1, wherein the expandable material has an expansion rate of 300 to 3000%.

14. A system having a structural element and the insulation element according to claim 1 arranged therein.

* * * * *